US010462957B2

(12) United States Patent
Clement et al.

(10) Patent No.: US 10,462,957 B2
(45) Date of Patent: *Nov. 5, 2019

(54) TRACTION MACHINE AND EQUIPMENT COMBINATION WITH DRIVER ASSISTANCE SYSTEM

(71) Applicant: CLAAS Tractor SAS, Vélizy-Villacoublay (FR)

(72) Inventors: Majorie Clement, Marcilly sur Eure (FR); Geoffrey De Wever, Bois-Arnault (FR); Florian Dirlewanger, Bad Saulgau (DE); Xavier Nivot, Le Plessis Robinson (FR); Clement Vilette, Meudon (FR); Thinus Glitz, Bad Driburg (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 248 days.

This patent is subject to a terminal disclaimer.

(21) Appl. No.: 15/590,526

(22) Filed: May 9, 2017

(65) Prior Publication Data
US 2017/0325394 A1    Nov. 16, 2017

(30) Foreign Application Priority Data

May 10, 2016   (DE) .................. 10 2016 108 590
Sep. 27, 2016  (DE) .................. 10 2016 118 205

(51) Int. Cl.
*A01B 69/04*    (2006.01)
*B60W 50/08*    (2012.01)
(Continued)

(52) U.S. Cl.
CPC ............ *A01B 69/008* (2013.01); *A01B 71/02* (2013.01); *B60G 17/0195* (2013.01);
(Continued)

(58) Field of Classification Search
CPC .... A01B 69/008; A01B 71/02; B60W 50/085; B60W 50/082; B60W 50/0098;
(Continued)

(56) References Cited

U.S. PATENT DOCUMENTS 5,992,533 A    11/1999   Scarlett et al.
6,144,910 A *  11/2000   Scarlett et al. ........ A01B 71/02
                                                    701/48
(Continued)

FOREIGN PATENT DOCUMENTS

DE          42 39 530 A1    5/1994
DE     10 2014 113 466 A1    3/2016
(Continued)

OTHER PUBLICATIONS

European Search Report for corresponding European Patent Application No. 16203914.3 dated Nov. 13, 2017, 8 pages.

*Primary Examiner* — Dale W Hilgendorf
(74) *Attorney, Agent, or Firm* — Lempia Summerfield Katz LLC

(57) ABSTRACT

An agricultural machine arrangement including at least one traction machine and at least one attachment device adapted to the traction machine, with a driver assistance system optimizing the operation of the traction machine and/or of the respective attachment device. The driver assistance system includes a computing unit and at least one display unit, wherein the computing unit processes information generated by machine-internal sensor systems, external information and information stored in the computing unit and wherein the traction machine and the attachment device include a control device for open-loop and closed-loop controlling the traction machine and/or of the attachment device. The driver assistance system forms an automatic traction machine adjusting unit and/or an automatic attachment device adjusting unit and the respective automatic (Continued)

adjusting units independently or as a function of one another bring about an optimization of the mode of operation of the traction machine and/or of the soil cultivation device.

19 Claims, 5 Drawing Sheets

(51) Int. Cl.
*B60W 50/00* (2006.01)
*A01B 71/02* (2006.01)
*B60G 17/0195* (2006.01)
*B60R 16/023* (2006.01)
*B62D 6/00* (2006.01)
*B60R 16/037* (2006.01)

(52) U.S. Cl.
CPC ..... *B60R 16/0236* (2013.01); *B60W 50/0098* (2013.01); *B60W 50/082* (2013.01); *B60W 50/085* (2013.01); *B62D 6/007* (2013.01); *B60G 2400/97* (2013.01); *B60R 16/0373* (2013.01); *B60W 2050/0013* (2013.01); *B60W 2050/0075* (2013.01); *B60W 2050/0083* (2013.01); *B60W 2300/152* (2013.01)

(58) Field of Classification Search
CPC . B60W 2050/0075; B60W 2050/0083; B60W 2050/0013; B60W 2300/152; B60R 16/0236; B60R 16/0373; B62D 6/007; B60G 17/0195; B60G 2400/97
See application file for complete search history.

(56) References Cited

U.S. PATENT DOCUMENTS

| | | | |
|---|---|---|---|
| 10,085,372 B2* | 10/2018 | Noyer et al. | A01B 71/02 |
| 2002/0082842 A1* | 6/2002 | Viaud | E02F 9/2004 704/275 |
| 2003/0121674 A1 | 7/2003 | Scarlett et al. | |
| 2010/0318241 A1* | 12/2010 | Post, II et al. | B60W 50/0098 701/41 |
| 2012/0004812 A1 | 1/2012 | Baumgarten et al. | |
| 2013/0211675 A1* | 8/2013 | Bonefas | A01B 69/008 701/41 |
| 2014/0172247 A1 | 6/2014 | Thomson | |
| 2015/0203123 A1* | 7/2015 | Darnell et al. | B60W 50/082 701/37 |
| 2016/0082789 A1 | 3/2016 | Wieckhorst et al. | |

FOREIGN PATENT DOCUMENTS

| | | |
|---|---|---|
| EP | 0 838 141 A2 | 4/1998 |
| EP | 1 321 017 A1 | 6/2003 |
| EP | 2 401 904 A2 | 1/2012 |
| EP | 2 818 337 A1 | 12/2014 |

* cited by examiner

TRACTION MACHINE AND EQUIPMENT COMBINATION WITH DRIVER ASSISTANCE SYSTEM

CROSS REFERENCE TO RELATED APPLICATIONS

This application claims priority to German Patent Application No. DE 102016118205.2, filed Sep. 27, 2016, and German Patent Application No. DE 102016108590.1, filed May 10, 2016, the entire disclosures of which is hereby incorporated herein by reference.

TECHNICAL FIELD

A traction machine equipment combination includes a driver assistance system that is equipped to make possible an optimization of the traction machine operation on its own or the combination of traction machine and equipment.

BACKGROUND

Traction machines, taken by themselves, and the combination of traction machine and attachment devices, such as for example transport trailers, loading wagons, hay rakes, tedders, mowers, balers, soil cultivation equipment, crop protection sprayers and fertilizer spreaders are highly complex and cost-intensive systems.

It is therefore important that such systems are operated efficiently.

The traction machine and the attachment device adapted to it are usually optimized frequently independently of one another and in different places. In addition, it is not verified if the optimized parameters found for the traction machine and that attachment device in fact lead to an optimization of the operation of the combination of traction machine and the respective attachment device. The optimization of the mode of operation of the traction machine and the attachment device assigned to it separately from one another additionally requires a high level of specialized knowledge of the traction machine driver since he/she has to carry out the essential adjustments such as for example engine, transmission and running gear adjustments on the traction machine and basic adjustments on the attachment device himself/herself, while the machines themselves or the respective available operating instructions support this process only partially.

EP 0 838 141 discloses a system with which the soil tilling device, embodied as a plough, is equipped with a job calculator which via a bus system is coupled to the operating and display unit of the traction machine embodied as tractor. The tractor driver can now specify adjusting parameters for the plough via the operating and display unit. Even by this example it is clearly evident how extensive the special knowledge of the operator has to be since with such systems the operator is required to specify adjusting parameters for both the traction vehicle and also the attachment device.

SUMMARY

The present disclosure provides a driver assistance system which better captures and takes into account the complex relationships during the adjustment optimization of a traction machine and an adapted attachment device so that the adjustment optimization of the traction machine and of the respective attachment device each taken by itself is rendered more effective and accelerated.

The agricultural machine arrangement or system includes at least one traction machine and at least one attachment device adapted to the traction machine. A driver assistance system optimizes the operation of the traction machine and/or of the respective attachment device. The driver assistance systems includes a computing unit and at least one display unit, wherein the computing unit processes information generated by machine-internal sensor systems, external information and information that can be stored in the computing unit. The traction machine and the at least one attachment device include a control device for open-loop and closed-loop controlling of the traction machine and/or the attachment device. The attachment device is embodied as soil cultivation device and the driver assistance system is structured so that it forms an automatic traction machine adjustment unit and/or an automatic adjustment device attachment unit. The respective automatic traction machine and attachment device adjustment units bring about, independently of one another or as a function of one another, an optimization of the mode of operation of the traction machine and/or of the at least one soil cultivation device. The driver assistance system includes selectable optimization strategies and the selectable optimization strategies are traction machine-specific strategies, attachment device-specific strategies and/or a combination of both of these. In this way, it is ensured that the adjustment optimization of a traction machine and of the respective attachment device each taken by itself and combined are rendered more effective and accelerated.

A particularly efficient mode of operation of a machine arrangement or system that is optimally adapted to certain working conditions is achieved when the optimization of the mode of operation of the traction machine and/or of the at least one soil cultivation device as a function of the selected optimization strategy includes an optimization of operating parameters of the traction machine and/or of the soil cultivation device adapted to the traction machine.

In an advantageous configuration, a particularly efficient mode of operation of a soil cultivation device can be achieved when the selectable optimization strategies comprise one or more of the optimization strategies "stubble cultivation", "power hop", "soil loosening", "levelness", "intermixing", "seedbed preparation", "crumbling" and "recompacting".

A significant improvement of the driving "comfort" and a significant reduction of the load-based machine wear can be achieved when the selectable optimization strategy "power hop" reduces the load-dependent building-up of the machine arrangement or system and the operating parameters are one or more of the following parameters: tire inflation pressure on a front axle, tire inflation pressure on a rear axle, and ballasting.

A significant improvement of the rotting behavior of stubbles is achieved when the selectable optimization strategy "stubble cultivation" brings about a low stubble height and the operating parameters include at least the adjustment of a minimal distance of the tools to the ground. This results, in particular, in the effect that crop remnants are reduced in size and are thoroughly intermixed with the soil and a high travelling speed can be additionally realized.

An improvement of the soil structure, which ultimately improves the air and water permeability of the soil, is achieved in that the selectable optimization strategy "soil loosening" brings about a loosening of the soil and the operating parameters include at least the penetration depth of the tools into the soil and/or the working speed and/or the tire pressure.

Since the selectable optimization strategy "levelness" brings about a reduction of ground irregularities by evening-out the ground surface structure and the operating parameters include the guiding of the tools over the ground, the adjustment of the tools and the working speed, it is additionally ensured that the negative effect of ground irregularities is significantly reduced in following soil cultivation processes such as for example the sowing.

In an advantageous further development, the selectable optimization strategy "intermixing" brings about an optimization of the "intermixing" of soil and crop remnants and the operating parameters are at least the so-called stubble tillage and the working depth.

In a further advantageous configuration, the selectable optimization strategy "seedbed preparation" brings about an optimization of the soil structure for a seedbed as a function of the type of fruit to be sowed and the operating parameters comprise at least the crumb structure and/or the seedbed depth and/or the recompaction of the soil.

Since the selectable optimization strategy "crumbling" brings about an optimization of the soil structure, in particular of a soil depth-dependent size of the soil components and wherein in this case the operating parameters likewise include at least the crumb structure and/or the seedbed depth and/or the recompaction of the soil, it is ensured that the soil even at greater depths still has a good air and water permeability. This effect is even further amplified also in that in a further advantageous configuration, the selectable optimization strategy recompaction brings about an optimization of the soil density as a function of the soil depth and the at least one operating parameter comprises the recompaction of the soil.

The efficiency of a machine arrangement can be increased particularly effectively even when in particular the selectable optimization strategies additionally or alternatively comprise one or more of the strategies "efficiency", "output", "working quality", "balance", "soil protection", "comfort" and/or "user-defined". Here it is advantageous when the optimization strategy "efficiency" optimizes the machine fuel consumption and/or the machine operating hours of the machine arrangement and/or the time required for so-called headland maneuvers;

the optimization strategy "output" is directed at the increase of the worked area and/or processed mass of agricultural goods and/or of the operating hours of the machine arrangement;

the optimization strategy "working quality" brings about the optimization of adjusting parameters of the traction machine and/or of the soil cultivation device;

the optimization strategy "balance" makes possible adjusting a variable ratio between "output" and "efficiency";

the optimization strategy "soil protection" reduces the soil pressure and/or the soil compaction caused by the machine arrangement and/or optimizes the tire inflation pressure, the ballasting and the weight of the machine arrangement, the type of tires, the steering mode and/or the running gear slip;

the optimization strategy "comfort" brings about a user-defined adjustment of the vibration behavior and/or acceleration behavior and/or of the volume of the machine arrangement;

the optimization strategy "user-defined" makes possible the manual adjusting of the parameters stored in the strategies.

In an advantageous configuration, the driver assistance system is constructed in such a manner that the automatic traction machine adjusting unit and the automatic attachment device adjusting unit form a joint automatic adjusting unit. This has the effect that the operation of even highly complex machine arrangements can be optimized with one and the same driver assistance system.

Since the driver assistance system includes a one or more sets of regulations assigned to the automatic traction machine adjusting unit, which brings about an optimization of the mode of operation of the traction machine independently of the mode of operation of the attachment device, the basic adjustments of a traction machine taken by themselves can also be optimized with the driver assistance system. In this connection, it is advantageous when the set(s) of regulations assigned to the automatic traction machine adjusting unit includes a set of regulations for optimizing the mode of operation of the attachment device, wherein the driver assistance system optimizes the mode of operation of the traction machine and/or of the attachment device. Such a structure has the effect that the driver assistance system can optimize the operation of a certain attachment device based on generally applicable relationships even without specific knowledge regarding the structure of said attachment device. The optimization of the operation of an attachment device by means of the driver assistance system is rendered substantially more effective in this connection even in particular when the set of regulations for optimizing the mode of operation of the attachment device is based on the set of regulations stored in the automatic traction machine adjusting unit or on a set of regulations provided by the respective attachment device.

A highly flexible structure of the driver assistance system is obtained in particular when the set of regulations for optimizing the mode of operation of the soil cultivation device is stored in a control device assigned to the traction machine. The control device may preferentially be embodied as a job calculator or a control device assigned to the soil cultivation device. The traction machine and the at least one soil cultivation device include International Organization for Standardization (ISO)-based control devices. The driver assistance system controls the automatic adjusting units formed by the control devices as a supervisor so that an optimization of the entire working process materializes.

In an advantageous further development, the driver assistance system includes an "operating purpose" module in which an operating purpose dialogue-guided by the operator is determined. For example, dialogue-guided input from the operator may be input to the "operating purpose" module to determine the operating purpose. The "operating purpose" module can include one or more of the operating purposes, such as soil tilling, power take-off operation, transport work and front loader work and in particular the parameters defined by the operator in the module "operating purpose." The operating parameters generated following the execution of an optimization strategy are stored as separate or joint result data set and the data set or data sets can be repeatedly accessed and edited. The data set or data sets can be stored and reaccessed in particular in a personalized manner. This has the effect, above all, that the optimization of parameters remains restricted to those parameters which are significant to the respective operating purpose and which, for a parameter that is standardized for a certain operating purpose, can already be determined in advance. Altogether, this results in that the optimizing process is accelerated. In addition, the reproducibility and the individualization of the process parameters optimized with the driver assistance system improve.

In addition, the operation of a machine arrangement can be further optimized in that the storable data set or data sets comprise specific data sets for working on field and road travel and the specific data sets for working on field and road travel are directly accessible.

In addition to the speed of the optimization process, the acceptance of a driver assistance system-based operation optimization can also be increased in that the dialogue between the driver assistance system and the operator takes place via natural speech.

In an advantageous further development, the dialogue between driver assistance system and operator includes at least one, any combination, or all of the following steps:

a) activating the driver assistance system by the operator or automatically upon identification of a critical situation b) activating an "operating purpose" module, wherein the operator brings about the editing of the operating purpose c) activating a "field/road" module, wherein the operator specifies the operation "field or road" or the driver assistance system (6) automatically detects the operation d) start of the "optimization" module, wherein the operator is requested to select the optimization strategy e) as a function of the selected optimization strategy, activation of a dialogue-guided optimization of operating parameters of the traction machine and/or of the soil cultivation device adapted to the traction machine.

BRIEF DESCRIPTION OF THE DRAWINGS

Exemplary embodiments are shown in a plurality of figures as follows.

DETAILED DESCRIPTION

Figure 1:
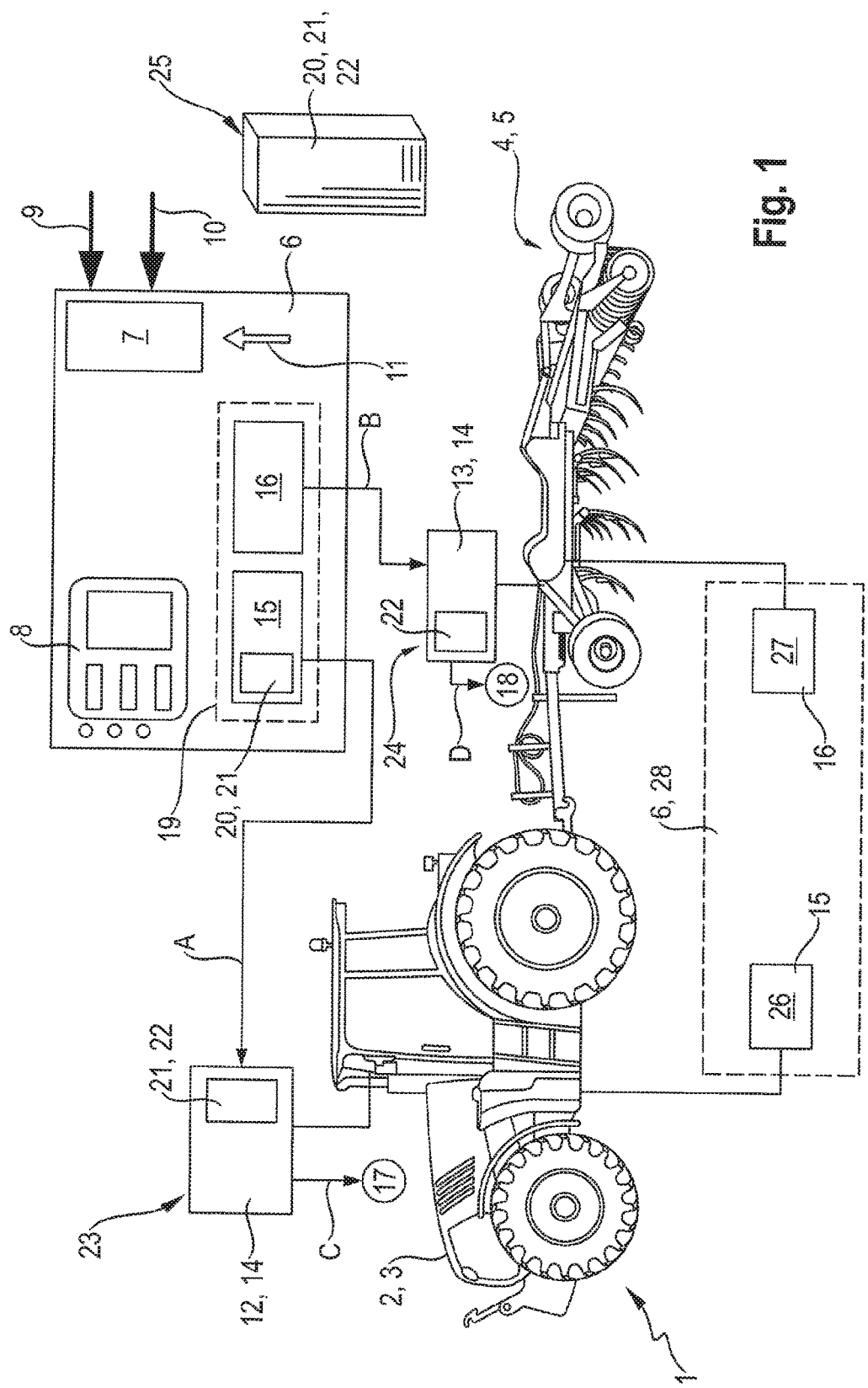
FIG. 1 is a schematic representation of the machine arrangement

The agricultural machine arrangement 1 shown in FIG. 1 includes a traction machine 3 embodied as a tractor 2 and at least one attachment device 5 coupled or adapted to the traction machine 3, as soil tilling device 4—here embodied so-called grubber. The attachment device 5 may be embodied as any attachment device such as for example as transport trailer, loading wagon, hay rake, tedder, mower, baler, other soil cultivation devices such as for example plough, crop protection sprayer or fertilizer spreader. In a manner still to be described, the machine arrangement 1 is assigned the driver assistance system 6 optimizing the operation of the traction machine 3 and/or of the respective attachment device 5. The driver assistance system 6 includes at least one computing unit 7 and a display unit 8, wherein the computing unit 7 processes information 9 generated by machine-internal sensor systems, external information 10 and information 11 that can be stored in the computing unit 7. The computing unit 7 may be hardware or a combination of hardware and software. In one implementation, the computing unit 7 may comprise a single computing unit. In an alternate implementation, the computing unit 7 may be segmented into multiple sub-computing units, which may be configured to execute specific functions, as discussed in further detail below. As one example, the computing unit (or a subpart thereof) may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, the computing unit 7 (or a subpart thereof) may include memory hardware that comprises instructions executable with a processor or processor circuitry to implement one or more of the features of the module. The display unit 8 is one example of an input and/or output unit. In particular, the display unit 8 may be configured to output information. Alternatively, or in addition, the display unit 8 may be configured to input operator selectable strategies, such as optimization strategies, as discussed further below.

In addition, the traction machine 3 and the attachment device 5 are assigned one or more control devices 12, 13 for open-loop and closed-loop controlling the traction machine 3 and/or the respective attachment device 5. The traction machine 3 and the attachment device 5 are assigned either separate control devices 12, 13 for activating the wide range of working elements or a common control unit 14. The common control unit 14 can then be positioned either on the traction machine 3 or the attachment device 5. The display unit 8 can also be configured to be mobile, so that it can be carried along by the operator of the machine arrangement 1.

In one implementation, the driver assistance system 6 is structured so that it forms an automatic traction machine adjusting unit 15 and an automatic attachment device adjusting unit 16, wherein the automatic adjusting units 15, 16, independently of one another or as a function of one another, bring about an optimization of the mode of operation of the traction machine 3 and of the at least one attachment device 5. Similar to the computing unit 7, the respective automatic adjusting units 15, 16 may each be hardware or a combination of hardware and software. In one implementation, the respective automatic adjusting units 15, 16 may each comprise a single computing unit configured to perform respective functionality. In an alternate implementation, the respective automatic adjusting units 15, 16 may comprise separate computing processes within a common computing device, such as automatic adjusting unit 19, discussed below.

In the simplest case, this is brought about in that the respective automatic adjusting unit 15, 16 generates control signals A, B, which are fed to the respective control unit 12, 13, 14 and, there, bring about in each case the activation of certain working elements 17, 18 of the traction machine 3 and of the attachment device 5 by generating corresponding control signals C, D.

In addition, the driver assistance system 6 can be constituted so that the automatic traction machine adjusting unit 15 and the automatic adjustment device adjusting unit 16 form a common automatic adjusting unit 19. In one implementation, the common automatic adjusting unit 19 may execute separate processes of programmed instructions that are configured to perform respective functions of the automatic traction machine adjusting unit 15 and the automatic attachment device adjusting unit 16, and that are independently managed by the common automatic adjusting unit 19. In a first specific implementation, the separate processes configured to perform respective functions of the automatic traction machine adjusting unit 15 and the automatic attachment device adjusting unit 16 may be executed on separate hardware units (e.g., on separate processor). In a second specific implementation, the separate processes configured to perform respective functions of the automatic traction machine adjusting unit 15 and the automatic attachment device adjusting unit 16 may be executed on a single hardware unit (e.g., on a single processor).

In addition, the driver assistance system 6 can include a set of regulations 20, which is assigned to the automatic traction machine adjusting unit 15 and which brings about an optimization of the mode of operation of the traction machine 3 independently of the mode of operation of the attachment device 5. In a simple configuration version, the set of regulations 20 assigned to the automatic traction machine adjusting unit 15 can include a set of regulations 21 for optimizing the mode of operation of the attachment device 5, so that the driver assistance system 6 optimizes the mode of operation of the traction machine 3 and of the attachment device 5. In addition to the direct storage in the automatic traction adjusting unit 15, the set of regulations 21 for optimizing the mode of operation of the attachment device 5 can also be provided by the respective attachment device 5 as an external set of regulations 22. Furthermore, the sets of regulations 21, 22 for optimizing the mode of operation of the attachment device 5 is stored in a control device 12 assigned to the traction machine 3 and preferentially embodied as job calculator 23 or in a control device 13 assigned to the attachment device 5 and preferentially likewise embodied as job calculator 24. Alternatively, or in addition, the disclosed sets of regulations 20-22 may also be centrally stored on a server 25.

When ISO-based control devices 26, 27 embodied as job calculator are assigned to the traction machine 3 and the at least one adapted attachment device 5, the driver assistance system 6 can control the automatic adjusting units 15, 16 formed by the control devices 26, 27 as supervisor 28 so that an optimization of the entire working process results.

Since the driver assistance system 6 is constituted so that it includes an automatic traction machine adjusting unit 15 and/or an automatic attachment device unit 16, which either function independently of one another or are combined in a common automatic adjusting unit 19, which then operates as supervisor 28 in a preferred configuration, a highly flexible assistance system for optimizing an agricultural machine arrangement 1 is created. A driver assistance system 6 structured in such a manner creates the possibility of assigning an automatic traction machine adjusting unit 15 to the traction machine 3, which independently of an attachment device 5 to be adapted, exclusively optimizes the operation of the traction machine 3. Since the automatic traction machine adjusting unit 15, in addition to the set of regulations 20 for the operation of the traction machine 3, also includes a set of regulations 21 for optimizing the operation of the attachment device 5, the driver assistance system 6 is able to optimize both the operation of the traction machine 3 and also of the attachment device 5. The set of regulations 21 bringing about the optimization of the attachment device 5 in this case can be structured so that it includes a basic set of regulations, which independently of the attachment device 5 is always stored in the driver assistance system 6. In an upgraded stage, the set of regulations 22 can be transferred from the attachment device 5 itself to the driver assistance system 6 for optimizing the operation of the respective attachment device 5. This has the advantage that the set of regulations 22 can much more specifically define the requirements, the optimal working conditions of the specific attachment device 5. In this regard, one or more aspects for optimizing operation of the attachment device may first be resident in the attachment device 5 (e.g., in the set of regulations 22) and may thereafter transferred by the attachment device 5 to the driver assistance system 6 in order for the driver assistance system 6 to optimize operation of the respective attachment device 5. When both the attachment device 5 and also the traction machine 3 include control devices 12, 13 embodied as job calculators 23, 24, the control devices 12, 13 can be embodied as ISO-based control devices 26, 27, which in each case includes the traction machine-based and the attachment device-based sets of regulations 20, 22 so that the driver assistance system 6 controls the automatic adjusting units 15, 16 as supervisor 28. This has the effect, in particular, that the working operation of the entire machine arrangement becomes optimizable taking into account a large number of complex relationships between traction machine 3 and one or more adapted or coupled attachment devices.

Figure 2:
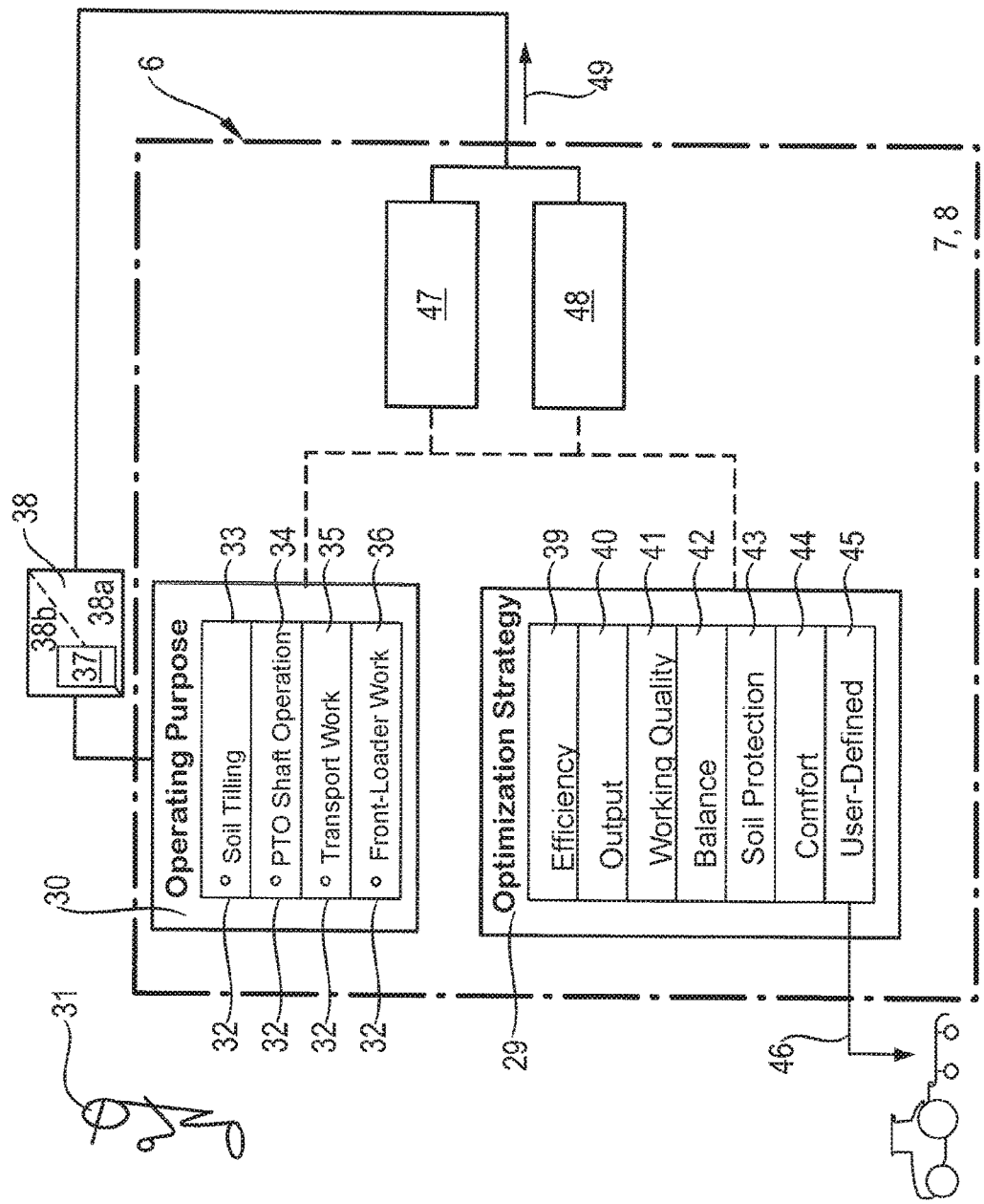
FIG. 2 is a detail view of the driver assistance system

FIG. 2 shows a schematic representation of the driver assistance system 6, wherein in this case visualization, operating and structural aspect are combined in one and the same representation. The driver assistance system 6 includes an "operating purpose" module 30, in which, dialogue-guided by the operator 31, an operating purpose 32 is determined, wherein the operator 31 can determine the operating purpose in advance, for example in the yard. In the shown exemplary embodiment, the "operating purpose" module 30 includes one or more of the operating purposes soil tilling 33, power take-off shaft operation 34, transport work 35 and front loader work 36. The operating parameters 37 defined by the operator 31 in the "operating purpose" module 30, described in more detail below, are stored as data set 38. Here, the data set 38 can include a basic data set 38a and a custom-specific data set 38b, wherein the basic data set includes all those data which need not mandatorily edited specifically by the operator and which are stored in a generally applicable and thus predefined manner by the operator for the task selected in the "operating purpose" module 30. The data set 38 generated in the "operating purpose" module 30 is stored repeatedly accessible and editable. The data set 38 can be stored either centrally on a server 25 or decentrally on the traction machine 3 and/or the attachment device 5 or a flexible storage medium such as for example a memory card or a USB stick. In this connection, the storable data set or data sets 38 are interchangeably stored in a personalized or freely accessible manner and thus interchangeable between different users 31 of a wide range of machine arrangements 1.

For optimizing the mode of operation of the traction machine 3 and/or of the attachment device 5 adapted to it, the driver assistance system 6 according to the invention additionally includes selectable optimization strategies 29 explained below in more detail, wherein the selectable optimization strategies 29 are traction machine-strategies, attachment device-specific strategies and/or a combination of both.

An efficient optimization of the machine arrangement 1 including the traction machine 3 and adapted attachment device 5 is obtained in particular when the selectable optimization strategies 29 include at least one or more of the strategies "efficiency" 39, "output" 40 (e.g., "performance output"), "working quality" 41, "balance" 42, "soil protection" 43, "comfort" 44 and "user-defined" 45.

The optimization strategy "efficiency" 39 in this case can optimize machine fuel consumption and machine operating hours and/or comprise the optimization of the time needed for so-called headland maneuvers.

In an advantageous configuration, the optimization strategy "output" 40 is directed at least at the increase of the worked area and/or processed mass of agricultural goods and/or of the machine operating hours.

Within the optimization strategy "working quality" 41, at least the optimization of adjusting parameters 46 of the traction machine 3 and/or of the attachment device 5, which are described in more detail below, is carried out in order to achieve a desired working result dependent on the type of the attachment device 5.

The optimization strategy "balance" 42 is designed so that a variable ratio between "output" 40 and "efficiency" 39 is adjustable.

The optimization strategy "soil protection" 43 is directed at the effects of the work of the machine arrangement 1 on the ground and optimizes adjusting parameters 46 of the traction machine 3 and of the attachment device 5 so that a soil-protecting mode of operation results. This optimization strategy is particularly effective when for example a minimization of the soil pressure and the soil compaction reduction connected with this, an optimization of the tire inflation pressure, a balanced balancing and thus a weight minimization as well as optimized tires, steering modes and a minimization of the running gear slip are taken into account or achieved.

The optimization strategy "comfort" 44 in the simplest case is constituted so that a user-defined vibration behavior and/or acceleration behavior and/or the volume of the machine arrangement 1 is/are adjustable.

The optimization strategy "user-defined" 45 makes it possible for the operator 31 to manually adjust the parameters stored in the optimization strategies 29 so that interactions and dependencies between the optimization strategies 29 can be better taken into account.

The driver assistance system 6 is additionally constituted so that it can either be operated in a dialogue mode 47 with the operator 31 or in an automatic mode 48. In both cases, the communication, such as the dialogue with the operator 31 takes place by way of natural speech.

The optimized operating parameters 46 in a data set 49 generated following the execution of the dialogue mode 47 or of the automatic mode 48 analogously to data set 38 can be stored reaccessibly and editably. In the simplest case, the data set 49 is part of the already described data set 38. Analogously to the data set 38, data set 49 can also be stored and re-accessed in a personalized manner.

Figure 3:
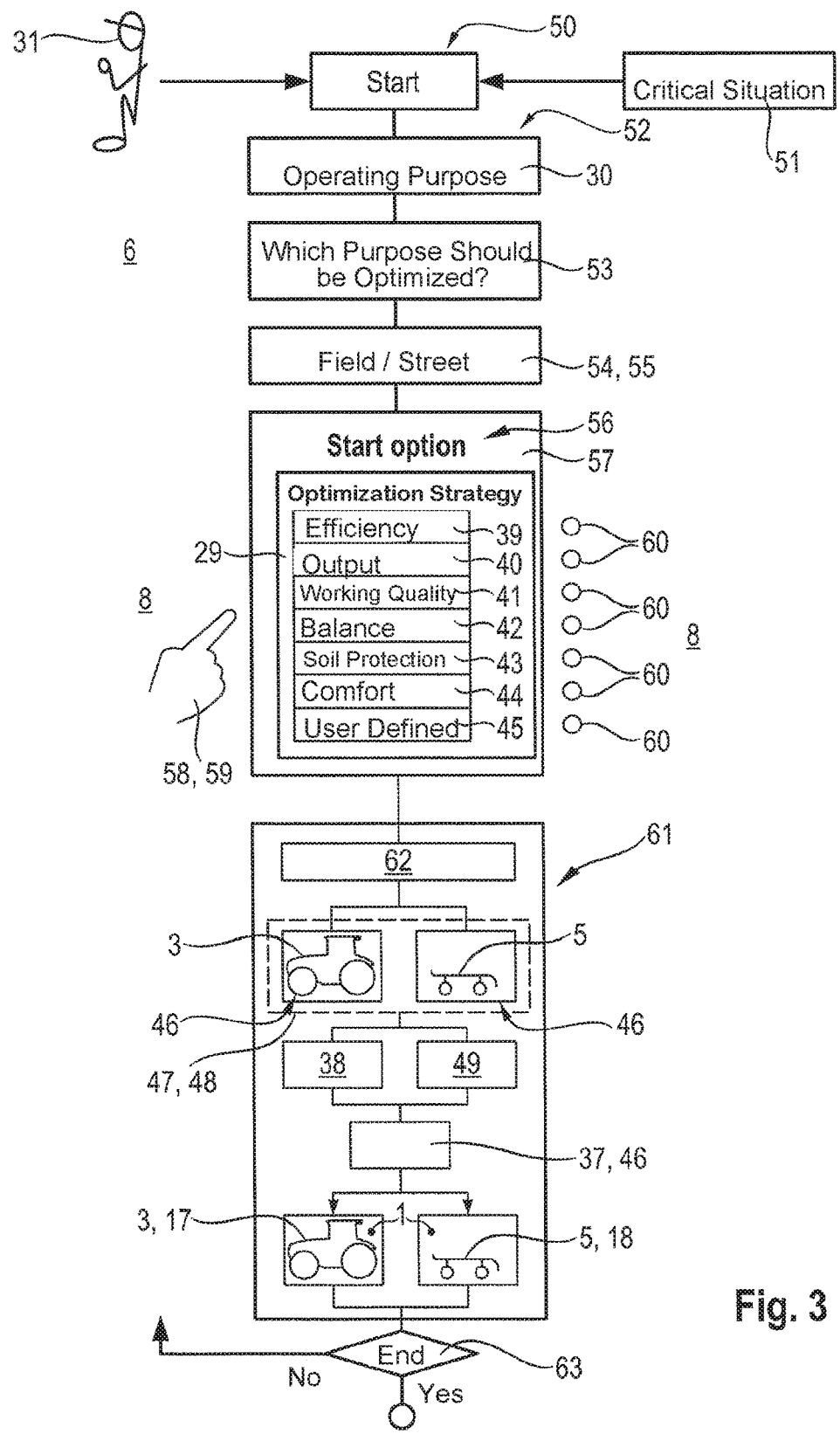
FIG. 3 is a flow diagram of the method according to which the driver assistance system operates

FIG. 3 describes the mode of operation of the driver assistance system 6, in particular the dialogue between operator 31 and driver assistance system 6, in more detail. In a first method step 50, activation takes place of the driver assistance system 6 by the operator 31 or automatically upon identification of a critical situation 51.

In the following step 52, the "operating purpose" module 30 is activated, wherein the operator 31 brings about the editing of the operating purpose 32. In the simplest case, at 53, the driver assistance system 6 will ask the operator 31 the question as to which of the operating purposes 32, explained in FIG. 2, optimization is to be initiated.

In the following method step 54, a module "field/road" 55 is activated, upon which the operator 31 specifies the operation "field or road" or the driver assistance system 6 automatically detects the operation.

In the simplest case, the automatic detection can be brought about in that the machine arrangement is assigned a GPS transmitter by means of which the position of the machine arrangement 1 can be determined. Here, it is also contemplated that position on a road or field is determined by way of a threshold value for the travelling speed of the machine arrangement, for example 25 km/h, travelling speeds above the threshold value being identified as road travel.

In the following step 56, a module "optimization" 57 is started, wherein the operator 31 is requested to select the optimization strategy 29, 30, 32-45. The selection of the respective optimization strategy 39-45 in this case can take place depending on the type of the display unit 8 through manual activation 58 on a touch screen monitor 59 or by activating the respective activation keys 60 assigned to the optimization strategy 39-45.

As a function of the selected optimization strategy 39-45, a dialogue-guided optimization 62 of operating parameters 46 of the traction machine 3 and/or of the attachment device 5 adapted to the traction machine 3 still to be explained will be activated in a further method step 61. The operation of a plurality of attachment devices 5 which are adapted for example to the front and rear as well as laterally is optimized at the same time. As already described, the optimization of the mode of operation of the traction machine 3 and of the adapted attachment device or attachment devices takes place in a dialogue mode 47 or in an automatic mode 48. As already likewise described, data sets 38, 49 are generated in both cases which include optimized operating parameters 37, 46 of the working elements 17, 18 of the traction machine 3 and/or of the attachment device or attachment devices 5. The driver assistance system 6 can be constituted so that the determined optimized operating parameters 37, 46 are either adjusted directly on the respective working element 17, 18, the operator 31 is asked if the determined operating parameters 37, 46 are to be adjusted or only a display of the optimized operating parameters 37, 46 takes place and the operator 31 subsequently has to trigger their adjustment or performs the same directly on the attachment device 5 by actuating actuators.

The storable data set or data sets (38, 49) can additionally include specific data sets for working on field and road travel, wherein the specific data sets (38, 49) for working on field and road travel are directly accessible.

Following the completed optimization of the operation of the machine arrangement 1, the operator 31 is asked in a decision-making step 63 if the optimization is to be terminated or not. Depending on the decision of the operator 31, the optimization is subsequently terminated or the driver assistance system 6 restarts with method step 50.

Figure 4:
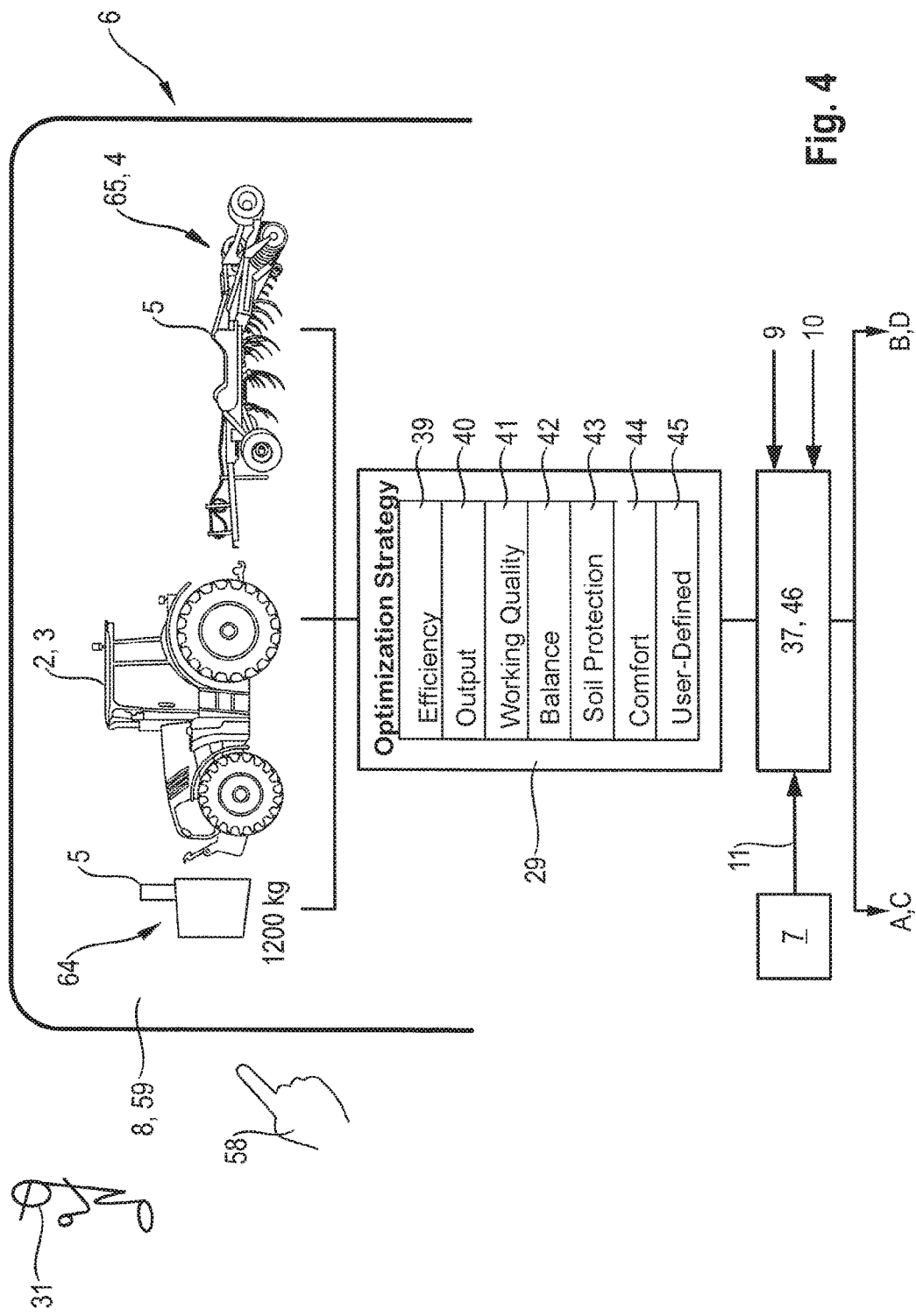
FIG. 4 is a detail view of the driver assistance system according to FIGS. 2 and 3

FIG. 4 schematically shows how by means of the driver assistance system 6 an optimization of the wide range of operating parameters 37, 46 of the traction machine 3 and of the attachment device or attachment devices 5 is carried out. For the sake of simplicity, a display unit 8 embodied as touch screen monitor 59 is assumed in the following. In one implementation, all manual activations 58 can also be realized by means of keys, which are not shown.

Initially, the operator 31 through manual activation 58 can determine if the mode of operation of the traction machine 3 embodied as tractor 2 and/or of the attachment devices 5 is to be optimized. In the shown exemplary embodiment, two types of attachment devices are exemplarily shown, namely a front weight 64 and a soil tilling device 4 embodied as grubber 65. As discussed above, other types of attachment devices are contemplated.

Since the respective icon for tractor 2 and/or attachment device 5 is activated, the dialogue field selection optimization strategy 29 opens and the operator 31 selects the desired optimization strategy 39-45. As a function of the selected optimization strategy 39-45, the driver assistance system 6 then determines, taking into account the available information 9 generated by machine-internal sensor systems and/or the available external information 10 and/or the information 11 stored in the computing unit 7, optimized operating parameters 37, 46 for the traction machine 3 and the attachment device or attachment devices 5. As previously described, the optimized operating parameters 37, 46 are then adjusted by way of corresponding control signals A-B to be transmitted to the tractor 2 or the attachment device 5.

Since the front weight 64 forms an original part of the traction machine 2 embodied as tractor 2, the optimization of the operation of the traction machine 2 can simultaneously include the optimization of the ballasting 64. In this case, an efficient optimization of the operating parameters 46 by means of the driver assistance system 6 according to the invention is achieved in particular when the editable and optimizable operating parameters 46 includes one or more of the following operating parameters 46:

engine lugging; acceleration; selection of the suitable driving range provided the drive of the traction machine permits operating in driving ranges; the travelling speed and the specification of speed values for a cruise control known per se; the activation and deactivation of an all-wheel drive; the activation and deactivation of a differential known per se; the tire status determination, comprising a proposal for suitable tires; definition of suitable ballasting weights 64 for front and/or rear attachment; driver's cab spring suspension; the front axle spring suspension; the behavior and the type of attachment of the attachment device 5 to the traction machine 3; adaptation of hydraulic adjustments, valves to be used, required oil quantity and oil delivery times; an optimized tire inflation pressure; the power take-off rotational speed; the type and embodiment of the power take-off shaft; the steering mode to be selected for example the crab steering mode known per se, standard steering, reverse travel, steering according to GPS data and/or driving programs.

Thus, in one implementation, the driver assistance system 6 may optimize any one, any combination, or all of the working parameters 46.

Figure 5:
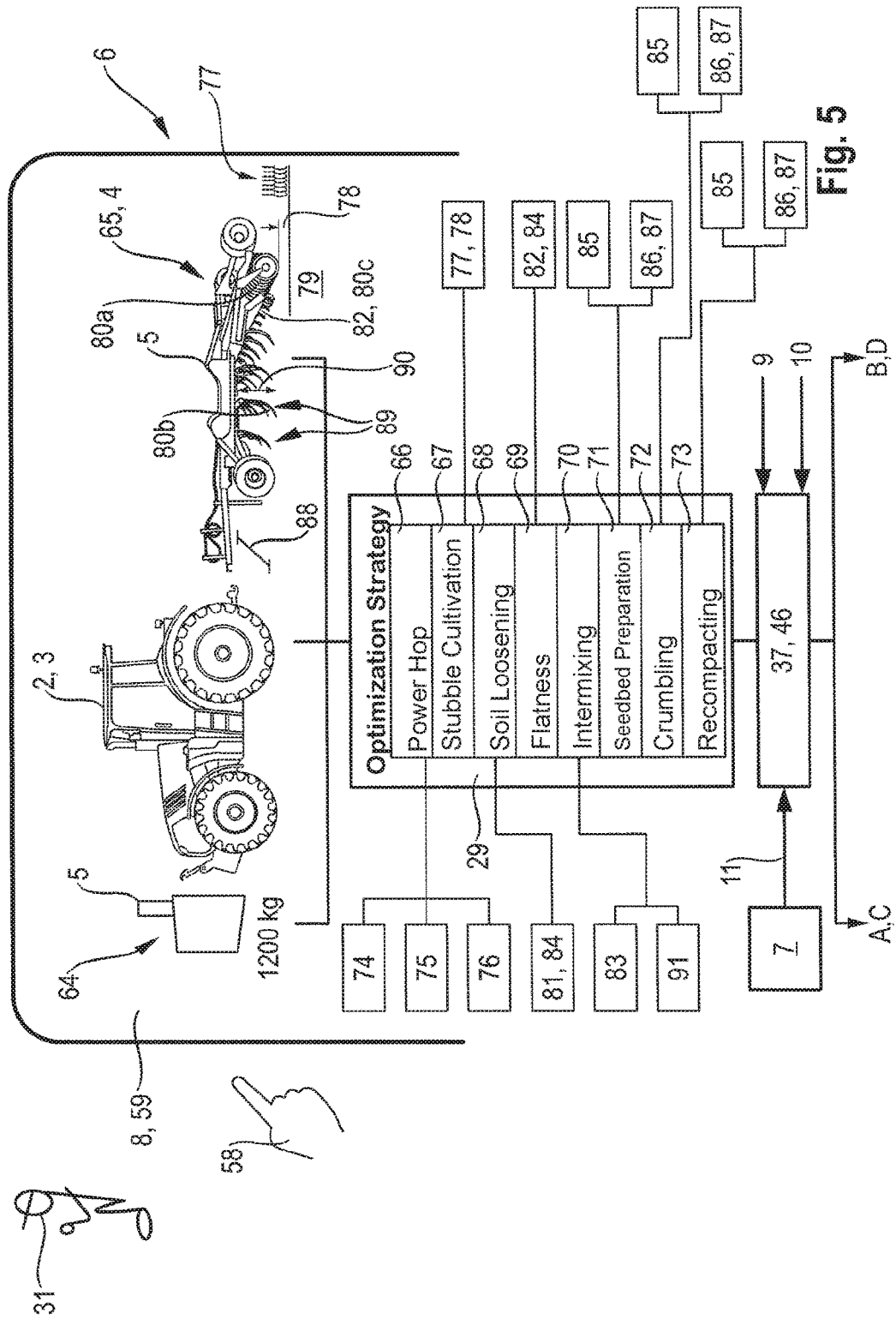
FIG. 5 is a detail view of the driver assistance system according to FIG. 4.

If the attachment device 5 is embodied as soil tilling device 4, for example as grubber 65, the driver assistance system 6, analogously to the already described selectable optimization strategies 29 can comprise "efficiency" 39, "output" 40, "working quality" 41, "balance" 42, "soil protection" 43, "comfort" 44 and "user-defined" 45 alternatively or additionally one or more of the selectable optimization strategies 29 schematically shown in FIG. 5, "power hop" 66, "stubble cultivation" 67, "soil loosening" 68, "levelness" 69, "intermixing" 70, "seedbed preparation" 71, "crumbling" 72 and "recompacting" 73.

According to FIG. 5, one of the optimization strategies 29 selected by the operator 31 can, for example, be the optimization strategy "power hop" 66. With respect to the subject of the optimization strategy "power hop" 66, reference is made to the patent documents DE 10 2014 113 466, U.S. Published Application No. 2016/082789 A1 and EP 2 818 337, the entire disclosure of each are incorporated by reference herein. The selectable optimization strategy "power hop" 66 reduces the load-dependent building-up of the machine arrangement 1, wherein the operating parameters 46 to be optimized are one or more of the following parameters: tire inflation pressure on a front axle 74, tire inflation pressure on a rear axle 75 and ballasting 76.

By means of the selectable optimization strategy "stubble cultivation" 67, at least the stubble height 77 or the so-called stubble tillage can be adjusted to be optimized, wherein the operating parameters 46 to be optimized comprise at least the adjustment of a minimal distance 78 of the tools 80a, influencing the stubble height 77 to the ground 79, with the objective that the ground 79 is worked as flat as possible and over the entire area. Preferentially, such tools 80 can be embodied as mulchers, which are known per se and therefore not described in more detail.

The selectable optimization strategy "soil loosening" 68 is directed to loosening the soil 79 and includes as operating parameters 46 to be optimized at least the penetration depth 81 of the tools 80b in the ground 79. The substantial effect of this optimization strategy is that a loose soil structure can also be specifically achieved in deeper soil layers.

By means of the selectable optimization strategy "levelness" 69, a reduction of ground irregularities by evening out the ground surface structure can be brought about, wherein the operating parameters 46 to be optimized can comprise for example the guiding of the tools 80c embodied as so-called coulter elements 82 over the ground 79 and/or adjusting the tools 80a-c and/or the working speed 84.

Furthermore, the selectable optimization strategy "intermixing" 70 can include an optimization of the "intermixing" of soil and crop remnants at various soil depths, wherein in this case the operating parameters 46 to be optimized include at least the adjustment of the so-called stubble tillage 91 and/or the working depth 83.

The selectable optimization strategy "seedbed preparation" 71 brings about an optimization of the soil structure for a seedbed preparation as a function of the type of fruit to be sowed, wherein in this case the operating parameters 46 to be optimized include at least the crumbling structure 85 and/or the seedbed depth 86 and/or the recompaction 87 of the soil 79.

By means of the selectable optimization strategy "crumbling" 72, an optimization of the soil structure, in particular a soil depth-dependent quantity of the soil components can be brought about, wherein here the operating parameters 46 to be optimized include at least the crumb structure 85 and/or the seedbed depth 86 and/or the recompaction 87 of the soil 79.

The selectable optimization strategy "recompacting" 73 finally brings about an optimization of the soil density as a function of the soil depths, wherein the operating parameters 46 to be optimized here comprise at least the crumb structure 85 and/or the seedbed depth 86 and/or the recompaction 87 of the soil.

A comprehensive optimization of the mode of operation of the agricultural machine arrangement 1 is additionally obtained in particular when the editable operating parameters 46 of the attachment device 5 embodied as grubber 65 are one or more of the following parameters: working depth of the tools 83; working width 88 of the attachment device 5; the preload of the traction cylinders assigned to a three-point attachment known per se; the number and type of the installed tools 89; the working speed of the attachment device 84; the adjustment of the existing tools 90; the type of the attachment of the attachment device 5 on the traction machine 3; type and status of a transport device.

LIST OF REFERENCE CHARACTERS

1 Machine arrangement
2 Tractor
3 Traction machine
4 Soil tilling device
5 Attachment device
6 Driver assistance system
7 Computing unit
8 Display unit
9 Internal information
10 External information
11 Storable information
12 Control device
13 Control device 14 Control unit
15 Automatic traction machine adjusting unit
16 Automatic attachment device adjusting unit
17 Working element
18 Working element
19 Automatic adjusting unit
20 Set of regulations for the tractor
21 Set of regulations for the attachment device internal
22 Set of regulations for the attachment device external
23 Job calculator
24 Job calculator
25 Server
26 ISO-based control device
27 ISO-based control device
28 Supervisor
29 Optimization strategy
30 "Operating purpose" module
31 Operator
32 Operating purpose
33 Soil tilling
34 Power take-off shaft operation
35 Transport work
36 Front loader work
37 Operating parameters
38 Data set
38a Basic data set
38b Custom-specific data set
39 Efficiency
40 Output
41 Working quality
42 Balance
43 Soil protection
44 Comfort
45 User-defined
46 Operating parameters
47 Dialogue mode
48 Automatic mode
49 Data set
50 Method step
51 Critical situation
52 Method step
53 Question
54 Method step
55 Module field/road
56 Method step
57 Module optimization
58 Manual activation
59 Touch screen monitor
60 Activation key
61 Method step
62 Dialogue-guided optimization
63 Decision-making step
64 Front weight
65 Grubber
66 Power hop
67 Stubble cultivation
68 Soil loosening
69 Levelness
70 Intermixing
71 Seedbed preparation
72 Crumbling
73 Recompacting
74 Tire inflation pressure front axle
75 Tire inflation pressure rear axle
76 Ballasting
77 Stubble height
78 Minimal distance
79 Ground
80a-c Tool
81 Penetration depth
82 Coulter element
83 Working depth
84 Working speed
85 Crumb structure
86 Seedbed depth
87 Recompaction
88 Working width
89 Type and number of tools
90 Adjustment of the tools
91 Stubble tillage
A Control signal
B Control signal
C Control signal
D Control signal

What is claimed is:

1. An agricultural machine system comprising:
at least one traction machine comprising a control unit;
at least one attachment device coupled to the traction machine, wherein the at least one attachment device comprises a soil cultivation device, the soil cultivation device comprising a control unit; and
a driver assistance system operably coupled to the traction machine and the attachment device, the driver assistance system comprising a computing unit and at least one input unit, the computing unit configured to process information generated by machine-internal sensor systems, external information and information stored in the computing unit, the computing unit comprising an automatic traction machine adjusting unit that is configured to automatically adjust the traction machine and an automatic attachment device adjusting unit that is configured to automatically adjust the soil cultivation device, the input unit configured to receive one or more selectable optimization strategies, the one or more selectable optimization strategies comprising traction machine-specific strategies and attachment device-specific strategies and include one or more of: efficiency, output, working quality, balance, soil protection, comfort or user-defined, the automatic traction machine adjusting unit is flexibly configurable to operate for automatic adjustment independently of the at least one attachment device and to operate for automatic adjustment dependently on the at least one attachment device, based on the selectable optimization strategy;
wherein the driver assistance system is configured to optimize, according to the one or more selectable optimization strategies and using the automatic adjusting unit of the computing unit, operation of the traction machine and the attachment device by generating one or more control signals as input to the control unit of the traction machine and to the control unit of the soil cultivation device.

2. The agricultural machine system of claim 1, wherein the automatic traction machine adjusting unit and the automatic attachment device adjusting unit are configured to operate independently of one another in order to optimize a mode of operation of the traction machine and the soil cultivation device.

3. The agricultural machine system of claim 1, wherein the automatic traction machine adjusting unit and the automatic attachment device adjusting unit are configured to operate as a function of one another in order to optimize a mode of operation of the traction machine and the soil cultivation device.

4. The agricultural machine system of claim 3, wherein the optimization strategy efficiency optimizes machine fuel consumption or machine operating hours of the agricultural machine system or time required for headland maneuvers;
   wherein the optimization strategy output is directed at increasing worked area, processed mass of agricultural goods, or operating hours of the agricultural machine system;
   wherein the optimization strategy working quality brings about the optimization of adjusting operating parameters of the traction machine or of the soil cultivation device;
   wherein the optimization strategy balance makes possible adjusting a variable ratio between output and efficiency;
   wherein the optimization strategy soil protection reduces soil pressure caused by the agricultural machine system, soil compaction, or optimizes at least one of tire inflation pressure, ballasting and weight of the agricultural machine system, type of tires, steering mode, or running gear slip;
   wherein the optimization strategy comfort brings about a user-defined adjustment of vibration behavior, acceleration behavior, or a volume of the agricultural machine system; and
   wherein the optimization strategy user-defined makes possible manual adjusting of the operating parameters stored in the optimization strategies.

5. The agricultural machine system of claim 1, wherein the optimization of the operation of the traction machine and the attachment device comprises optimizing operating parameters of the traction machine and operating parameters of the soil cultivation device.

6. The agricultural machine system of claim 5, wherein the selectable optimization strategies comprise one or more of the optimization strategies power hop, stubble cultivation, soil loosening, levelness, intermixing, seedbed preparation, crumbling and recompaction.

7. The agricultural machine system of claim 6, wherein the selectable optimization strategy power hop reduces load-dependent building-up of the agricultural machine system and the operating parameters are one or more of the following parameters: tire inflation pressure on a front axle, tire inflation pressure on a rear axle, and balancing.

8. The agricultural machine system of claim 6, wherein the selectable optimization strategy stubble working brings about a low stubble height or an adjustment of stubble tillage, and the operating parameters comprise at least the adjustment of a minimal distance of tools to a ground.

9. The agricultural machine system of claim 6, wherein the selectable optimization strategy soil loosening brings about a loosening of soil and the operating parameters comprise at least a penetration depth of tools in a ground or a working speed.

10. The agricultural machine system of claim 6, wherein the selectable optimization strategy levelness brings about a reduction of ground irregularities by evening out a ground surface structure and the operating parameters comprise guiding of tools over a ground or adjustment of the tools and working speed.

11. The agricultural machine system of claim 6, wherein the selectable optimization strategy intermixing brings about an optimization of intermixing of soil and crop remnants and the operating parameters comprise at least stubble tillage or working depth.

12. The agricultural machine system of claim 1, wherein the automatic adjusting unit comprise an automatic traction machine adjusting unit and an automatic attachment device adjusting unit that form a common automatic adjusting unit.

13. The agricultural machine system of claim 12, wherein the driver assistance system comprises a set of regulations assigned to the automatic traction machine adjusting unit and is configured to optimize a mode of operation of the traction machine independently of a mode of operation of the soil cultivation device.

14. The agricultural machine system of claim 13, wherein the driver assistance system further comprises a set of regulations configured to optimize the mode of operation of the soil cultivation device; and
   wherein the set of regulations for optimizing the mode of operation of the soil cultivation device is provided by the soil cultivation device.

15. The agricultural machine system of claim 14, wherein the set of regulations for optimizing the mode of operation of the soil cultivation device is stored in the control unit of the soil cultivation device;
   wherein the traction machine and the soil cultivation device comprise International Organization for Standardization (ISO)-based control devices; and
   wherein the driver assistance system is configured to supervise control of the automatic traction machine adjusting unit and the automatic attachment device adjusting unit so that an optimization of an entire working process results.

16. The agricultural machine system of claim 15, wherein the driver assistance system comprises an operating purpose module;
   wherein the input unit is configured to receive dialogue-guided input by an operator;
   wherein the driver assistance system is configured to determine an operating purpose based on the dialogue-guided input;
   wherein the operating purpose module comprises one or more of the following operating purposes: soil tilling; power take-off shaft operation; transport work; and front loader work;
   wherein the operating parameters are stored as separate or joint result data set; and
   wherein the data set is storable and reaccessible in a personalized manner.

17. The agricultural machine system of claim 16, wherein the storable data set comprises specific data sets for working on field and road travel;
   wherein the specific data sets for working on field and road travel are directly accessible; and
   wherein dialogue between the driver assistance system and the operator takes place by way of natural speech.

18. A method of operating an agricultural machine system comprising:
   activating a driver assistance system by an operator or by automatic identification of a critical situation, wherein the driver assistance system is operably coupled to a traction machine and an attachment device that comprises a soil cultivation device, the soil cultivation device comprising a control unit, the driver assistance system comprising a computing unit and at least one input unit, the computing unit configured to process information generated by machine-internal sensor systems, external information and information stored in the computing unit, the computing unit comprising an automatic traction machine adjusting unit that is configured to automatically adjust the traction machine and an automatic attachment device adjusting unit that is configured to automatically adjust the soil cultivation device, the input unit configured to receive one or more selectable optimization strategies, the one or more selectable optimization strategies comprising traction machine-specific strategies and attachment device-specific strategies and include one or more of: efficiency, output, working quality, balance, soil protection, comfort or user-defined, the automatic traction machine adjusting unit is flexibly configurable to operate for automatic adjustment independently of the attachment device and to operate for automatic adjustment dependently on the attachment device, based on the selectable optimization strategy, wherein the driver assistance system is configured to optimize, according to the one or more selectable optimization strategies and using the automatic adjusting unit of the computing unit, operation of the traction machine and the attachment device by generating one or more control signals as input to a control unit of the traction machine and to the control unit of the soil cultivation device;

activating an operating purpose module, wherein the operating purpose module is configured to receive input from the operator to edit an operating purpose;

activating a field/road module, wherein the field/road module is configured to receive input from the operator that specifies an operation field or road, or configured to automatically detect an operation;

starting an optimization module, wherein the optimization module is configured to receive an optimization strategy from the operator; and as a function of the selected optimization strategy, activating a dialogue-guided optimization of operating parameters of the traction machine or of the soil cultivation device adapted to the traction machine.

19. The agricultural machine system of claim 1, wherein the automatic traction machine adjusting unit and the automatic attachment device adjusting unit are independently managed by a common automatic adjusting unit.

* * * * *